No. 808,226. PATENTED DEC. 26, 1905.
E. H. ANDERSON.
CONTROLLER FOR MAGNETIC CLUTCHES.
APPLICATION FILED JULY 20, 1904.
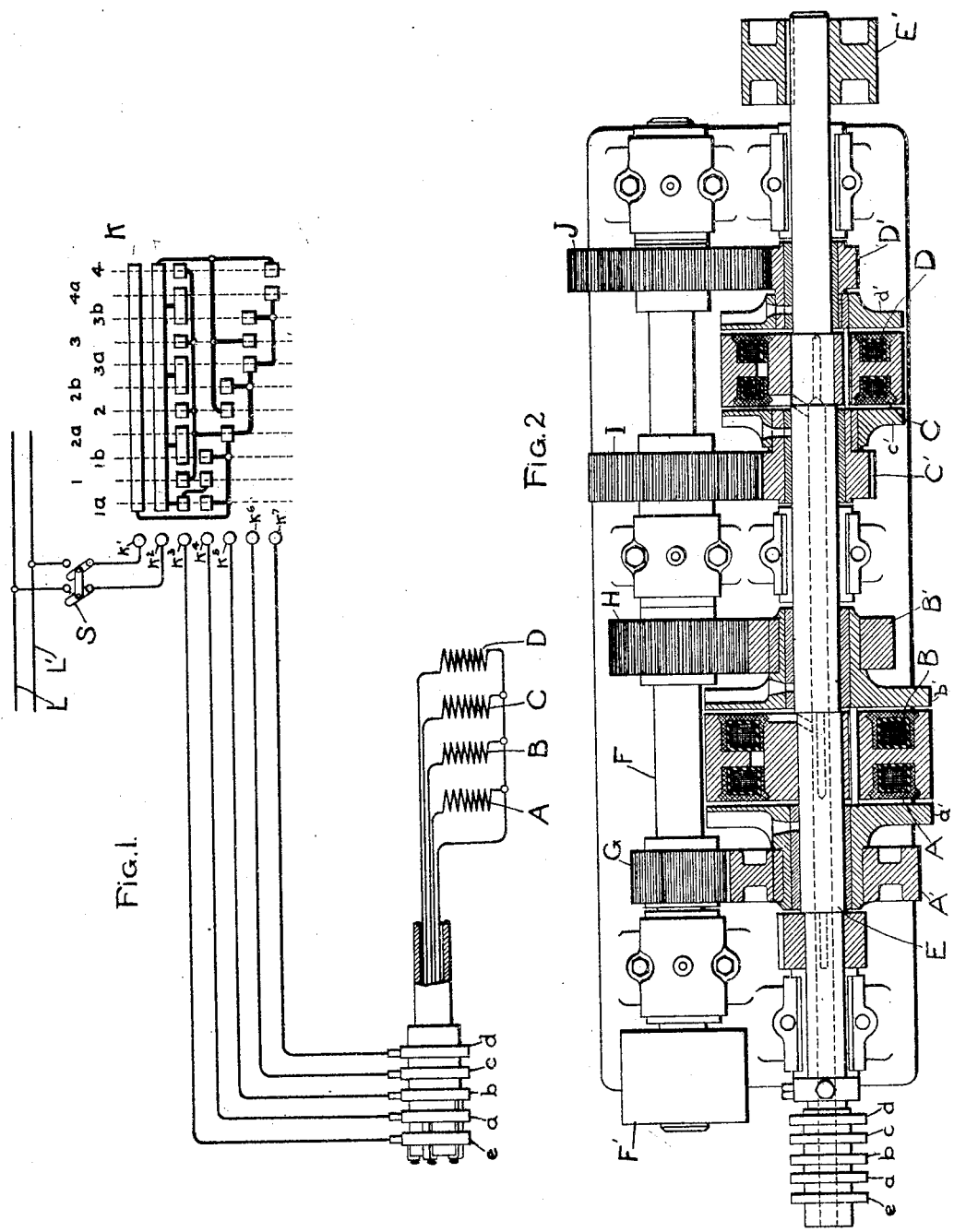
Witnesses
Lloyd C. Bush
Helen Oxford
Inventor
Edward H. Anderson
By Albert L. Davis
Attorney

UNITED STATES PATENT OFFICE.

EDWARD H. ANDERSON, OF SCHENECTADY, NEW YORK, ASSIGNOR TO GENERAL ELECTRIC COMPANY, A CORPORATION OF NEW YORK.

CONTROLLER FOR MAGNETIC CLUTCHES.

No. 808,226.          Specification of Letters Patent.          Patented Dec. 26, 1905.

Application filed July 20, 1904. Serial No. 217,312.

*To all whom it may concern:*

Be it known that I, EDWARD H. ANDERSON, a citizen of the United States, residing at Schenectady, in the county of Schenectady and State of New York, have invented certain new and useful Improvements in Controllers for Magnetic Clutches, of which the following is a specification.

My invention relates to controlling-switches for magnetic clutches. Magnetic clutches are peculiarly adapted for use in variable-speed power-transmission mechanisms where a source of current is available on account of the ease with which they may be controlled, and numerous power-transmission mechanisms have been devised comprising a plurality of gears controlled by different clutches so arranged that by deënergizing one clutch or set of clutches and energizing another the speed ratio of the driving and driven member may be changed. One objection to the use of magnetic clutches for this purpose lies in the residual magnetism which appears after a clutch has been energized. When the circuit of one clutch is broken and the circuit of another clutch is closed, the first clutch does not wholly release the gear controlled thereby; but the residual magnetism, which is very strong immediately after the breaking of the circuit of a clutch, tends to keep two pairs of gears in mesh with each other, and consequently to impose undue strains on the transmission mechanism.

The object of my invention is to provide a controlling-switch for electromagnetic variable-speed power-transmission mechanisms by means of which the above objection may be eliminated.

My invention consists in providing a controlling-switch with intermediate positions on either side of the running position for each clutch or set of clutches, so that when one clutch or set of clutches is to be energized and another is to be deënergized it is necessary to pass through an intermediate position, in which the clutch that is to be deënergized is momentarily connected in circuit with its terminals reversed. This sends an instantaneous flow of current through the clutch-winding in the proper direction to demagnetize the clutch and to remove all residual magnetism.

My invention will best be understood by reference to the accompanying drawings, in which—

Figure 1 shows a controlling-switch arranged in accordance with my invention and adapted for the control of an electromagnetic variable-speed power-transmission mechanism employing four clutches; and Fig. 2 shows one form of such a transmission mechanism, partly in cross-section, to which my invention is applicable.

Referring first to Fig. 2, E represents a shaft carrying the four magnetic clutches A, B, C, and D. Four gears A', B', C', and D' are loosely journaled on shaft E, and each carries an armature $a'$, $b'$, $c'$, and $d'$, adapted to be engaged by the four clutches, respectively, and thereby to be locked to shaft E. A second shaft F carries four gears G, H, I, and J, meshing with gears A' to D', respectively. Shaft F carries a pulley F' and shaft E carries a similar pulley E'. If power is applied to shaft F through pulley F' and if magnet-winding A is energized, shaft E will be driven through gears G and A', and power may be taken off from pulley E'. If magnet-winding A is deënergized and winding B energized, gear B' will be locked to shaft E and shaft E will be driven at a higher speed, due to the smaller reduction between gears H and B'. If gear A' is released by its clutch, it will run idle on the shaft. If, however, clutch A has a strong residual magnetism, it will tend to hold gear A' locked to the shaft, so that the two shafts F and E will be connected through two pairs of gears of different speed ratios. This, as will be readily seen, places an undue strain on the transmission mechanism.

Referring now to Fig. 1, K represents a controller two fingers of which, $k'$ and $k^2$, are connected, through the switch S, to the line-wires or other source of current L L' for the magnet-windings of the clutches. The fingers $k^3$ to $k^7$ are connected to the collector-rings $a$ to $e$, respectively, the collector-rings $a$ to $d$ being connected, respectively, to one terminal of clutch-windings A to D and the fifth collector-ring being connected to the other terminals of all the windings either by grounding on shaft E or otherwise.

The operation of the controller K is as follows: In Fig. 1 controller K is shown in its off position. Now if it is moved to bring the movable contacts on the dotted line $1^a$ into engagement with the stationary contact-fingers a circuit is completed from line-wire L to contact-finger $k^2$, contact-finger $k^3$, to collector-ring $e$, to lower terminal of magnet-winding A, through winding A, to collector-ring $a$, to contact-finger $k^4$, to contact-finger $k'$, to line-wire L'. The clutch-winding A is consequently energized. Position $1^a$, however, is only an intermediate position, not a running position, the first running position being indicated by dotted line 1. In passing from position $1^a$ to position 1 it will be seen that the connections of winding A are reversed. The position $1^a$ is of no importance when the controller is moved in this direction, but is of importance when the controller is moved from position 1 to off position. In this latter movement it serves to momentarily reverse, and consequently to demagnetize, clutch A. In passing from position 1 to position 2 it is necessary to pass through two intermediate positions. The first intermediate position $1^b$ serves to reverse and demagnetize winding A. Position $2^a$ is of no effect during this direction of movement of the controller, but serves to demagnetize clutch B when the controller is moving in the opposite direction. In position 2 clutch B is energized. In passing through position $2^b$ clutch B is reversed and demagnetized. In position 3 clutch C is energized. In position $3^b$ clutch C is reversed and deënergized. In position 4 clutch D is energized. Thus it is seen that positions 1, 2, 3, and 4 are the running positions for the controller. Positions $1^b$, $2^b$, and $3^b$ serve to demagnetize the several clutches in moving the controller from off position to position 4. Positions $4^a$, $3^a$, $2^a$, and $1^a$ serve to demagnetize the several clutches when moving from position 4 to off position. Thus no matter in which direction the controller is being moved each clutch is completely demagnetized before the circuit of another clutch is completed.

Although I have shown my invention as applied to a plurality of clutches arranged to connect two parallel shafts through pairs of gears with different speed ratios, only one clutch being energized at a time, it will be understood that it is not limited to this particular application, but may be used with advantage in any electromagnetic variable-speed power-transmission mechanism in which the simultaneous energizing of two clutches or sets of clutches would result in undesirable strains in the mechanism. Accordingly I do not desire to limit myself to the particular construction and arrangement of parts shown; but I aim in the appended claims to cover all such modifications which are within the scope of my invention.

What I claim as new, and desire to secure by Letters Patent of the United States, is—

1. In combination with a variable-speed transmission mechanism comprising a plurality of electromagnetic clutches, a controller for said clutches having a plurality of running positions arranged to connect said clutches for the several speeds, and intermediate positions arranged to reverse momentarily the circuit connections of each clutch when breaking said circuit connections in passing from one running position to another.

2. In combination with a variable-speed transmission mechanism comprising a plurality of electromagnetic clutches, a controller for said clutches adapted and arranged to reverse momentarily the circuit connections of each clutch when breaking said circuit connections in passing from one position to another.

3. In combination with a variable-speed transmission mechanism comprising a plurality of electromagnetic clutches, a source of current therefor, and a controlling-switch having a plurality of running positions arranged to connect said clutches in different relations to the source for the different speeds, and intermediate positions on each side of each running position arranged to connect a clutch to the source with its terminal connections reversed relatively to its connections in the adjacent running position.

In witness whereof I have hereunto set my hand this 18th day of July, 1904.

EDWARD H. ANDERSON.

Witnesses:
ALEX. F. MACDONALD,
HELEN ORFORD.